(12) United States Patent
Steiner et al.

(10) Patent No.: US 11,205,245 B2
(45) Date of Patent: Dec. 21, 2021

(54) METHOD OF IMPROVING VISUAL RECOGNITION OF AN ITEM AND ITEM DISPLAY SYSTEM

(71) Applicant: OCADO INNOVATION LIMITED, Hatfield (GB)

(72) Inventors: Tim Steiner, Hatfield (GB); Hannah Gibson, Hatfield (GB); Lawrence Hene, Hatfield (GB); Yess Padilla, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 573 days.

(21) Appl. No.: 16/096,687

(22) PCT Filed: Apr. 25, 2017

(86) PCT No.: PCT/EP2017/059839
§ 371 (c)(1),
(2) Date: Oct. 25, 2018

(87) PCT Pub. No.: WO2017/186746
PCT Pub. Date: Nov. 2, 2017

(65) Prior Publication Data
US 2021/0224948 A1   Jul. 22, 2021

(30) Foreign Application Priority Data
Apr. 26, 2016 (GB) .................................. 1607283

(51) Int. Cl.
*G06T 3/40* (2006.01)
*G06Q 30/06* (2012.01)

(52) U.S. Cl.
CPC ........... *G06T 3/40* (2013.01); *G06Q 30/0643* (2013.01); *G06Q 30/0623* (2013.01); *G06T 2200/24* (2013.01)

(58) Field of Classification Search
CPC .............................. G06T 3/40; G06Q 30/0643
See application file for complete search history.

(56) References Cited

U.S. PATENT DOCUMENTS 2,701,065 A    2/1955  Bertel
9,129,404 B1 * 9/2015  Wagner .............. G06Q 30/0643
(Continued)

FOREIGN PATENT DOCUMENTS

CN      105844364 A    8/2016
EP        0767113 A2   4/1997
(Continued)

OTHER PUBLICATIONS

Cazenave, T., "Partial Move A*", 22nd International Conference on Tools with Artificial Intelligence, IEEE Computer Society, pp. 25-31, 2010.
(Continued)

*Primary Examiner* — Yi Yang
(74) *Attorney, Agent, or Firm* — Buchanan Ingersoll & Rooney PC

(57) ABSTRACT

A method of improving visual recognition of an item amongst a plurality of items displayed by an electronic device having a display includes providing a number of sets of actual dimensions of a number of the plurality of items, respectively, the number of the plurality of items including the item. A scaling factor is determined using the number of sets of actual dimensions and a number of sets of image dimensions of a respective number of representations of the number of the plurality of items respectively contained in a number of images. The scaling factor is applied to a dimension of an image to be displayed containing a representation of the item, and the scaled image is displayed.

14 Claims, 9 Drawing Sheets

(56) References Cited

U.S. PATENT DOCUMENTS

| | | | |
|---|---|---|---|
| 10,126,747 B1 | 11/2018 | Svec et al. | |
| 2002/0051205 A1* | 5/2002 | Teranishi | H04N 1/3872 358/1.18 |
| 2009/0185241 A1* | 7/2009 | Nepomniachtchi | G06Q 20/042 358/474 |
| 2010/0082194 A1 | 4/2010 | Yabushita et al. | |
| 2012/0330781 A1 | 12/2012 | Borrero | |
| 2013/0094721 A1* | 4/2013 | Kawasaki | G06F 16/58 382/118 |
| 2014/0052549 A1* | 2/2014 | Dollens | G06Q 30/0623 705/14.73 |
| 2015/0002548 A1* | 1/2015 | Tsutsumitake | G09G 5/14 345/635 |
| 2015/0093018 A1* | 4/2015 | Macciola | G06T 5/006 382/154 |
| 2016/0016311 A1 | 1/2016 | Konolige et al. | |
| 2016/0086071 A1* | 3/2016 | Fang | G06K 7/1417 235/462.04 |
| 2016/0194151 A1 | 7/2016 | Lindbo et al. | |

FOREIGN PATENT DOCUMENTS

| | | |
|---|---|---|
| EP | 1037828 B1 | 9/2000 |
| EP | 2407845 A1 | 1/2012 |
| GB | 2520104 A | 5/2015 |
| GB | 2524383 A | 9/2015 |
| GB | 2528568 A | 1/2016 |
| NO | 317366 B1 | 10/2004 |
| WO | 2015185628 A2 | 12/2015 |

OTHER PUBLICATIONS

Cohen, D. et al,. "Implementation of Parallel Path Finding in a Shared Memory Architecture", Department of Computer Science, 5 pages.

Falou, M. et al., "DEC-A*: Decentralized Multiagent Pathfinding Algorithm", 24th International Conference on Tools with Artificial Intelligence, IEEE Computer Society, p. 516-523, 2012.

Combined Search and Examination Report under Sections 17 and 18(3) dated Oct. 10, 2017, issued by the Intellectual Property Office in the corresponding United Kingdom Patent Application No. GB1706661.4.

Examination Report under Section 18(3) dated Aug. 23, 2018, issued by the Intellectual Property Office in the corresponding United Kingdom Patent Application No. GB1706661.4.

International Search Report (PCT/ISA/210) dated Jun. 12, 2017, by the European Patent Office as the International Searching Authority for International Application No. PCT/EP2017/059839.

International Search Report (PCT/ISA/210) dated Jul. 31, 2017, by the European Patent Office as the International Searching Authority for International Application No. PCT/EP2017/059999.

Written Opinion (PCT/ISA/237) dated Jun. 12, 2017, by the European Patent Office as the International Searching Authority for International Application No. PCT/EP2017/059839.

Written Opinion (PCT/ISA/237) dated Jul. 31, 2017, by the European Patent Office as the International Searching Authority for International Application No. PCT/EP2017/059999.

R. Wenderlich, "Introduction to A* Pathfinding / raywenderlich. com", Sep. 29, 2011, pp. 1-10, XP055627566, URL:hllps://www. raywenderlich.com/3016-introduction-to-a-pathfinding[retrieved on Oct. 1, 2019].

Wikipedia page for A* Search Algorithm, printed Jul. 19, 2019, https://en.wikipedia.org/w/index.php?title+A*_search_ algorithm&oldid=714320166. (9 pages).

D. Silver, "Cooperative Pathfinding", "AIIDE", 2005, AMI Press, pp. 117-122.

M. Tao et al., "Optimal route re-planning for mobile robots: a massively parallel incremental A* algorithm", IEEE proceedings of International Conference on Robotics and Automation, 1997, pp. 2727-2732.

Office Action (Rejection) dated Nov. 20, 2020, by the U.S. Patent Office in co-pending U.S. Appl. No. 16/096,646. (8 pages).

Office Action (Communication) dated Oct. 9, 2019, by the European Patent Office in corresponding European Patent Application No. 17731068.7. (9 pages).

* cited by examiner

METHOD OF IMPROVING VISUAL RECOGNITION OF AN ITEM AND ITEM DISPLAY SYSTEM

The present invention relates to a method of improving visual recognition of an item, the method being of the type that, for example, outputs a plurality of images comprising respective representations of selectable items, such as in an online retail environment. The present invention also relates to an item display system of the type that, for example, comprises an electronic device for outputting a plurality of images comprising respective representations of selectable items, such as in an online retail environment.

Improvement in the range of goods and items available to purchasers through online retailers for home delivery has led to a significant increase in online shopping traffic. In the grocery sector, some online retailers are now offering a choice of over 50,000 items available for home delivery via orders placed online. Whilst many shoppers enjoy the online shopping experience, in some cases the experience could be improved by clearer and more user-friendly Graphical User Interfaces (GUIs).

One example of a GUI relating to an online retail system comprises displaying inventory items for purchase via an online retail website. The display of each item comprises providing a placeholder and disposing therein an image of a Front Of Pack (FOP) of an item, information relating to the item, for example weight, size, organic status, vegetarian status, availability, price of the item and information relating to any special offers.

The arrangement of the information and images relating to inventory items as described above is designed to be regular and to show as much information in the placeholder as possible. For example, the image of the FOP can be scaled such that the image is displayed as large as possible in the portion of the placeholder allocated to the image. This is in order to show as much information in relation to the product as possible. FOP images can be provided by image banks or can be captured via suitable photographic equipment by a retailer as required. The placeholder relating to each item is of a fixed size, and the information disposed therein relates to the item being scaled to fit the placeholder.

It will be appreciated that using such an arrangement as described above, leads to a display of inventory items that, whilst regular and easy to achieve from a computer programming viewpoint, results in a display having large amounts of white, unused space while providing a relatively low density of inventory items on the page.

Online retailers have attempted to reduce the complexity of the images and pages the user is required to access and also to reduce the clutter within specific pages from which specific items are chosen. However, the retailer must fulfil requirements to supply the relevant information to the user whilst making the online shopping experience enjoyable to encourage repeat orders.

In an attempt to provide purchasers with an improved user-friendly user interface, some retailers have even virtualised stores, in certain cases providing three-dimensional views of aisles, shelves and checkouts. Using these tactics, online retailers can replicate the shopping experience of visiting an actual store. US patent publication no. US 2012/0330781A1 discloses a system and method for shopping for goods using a virtualised and personalised storefront. In particular, a shopper-tailored, virtual, model of a physical storefront where items are located in a configuration specific to customer preferences is disclosed. A single virtual model can correspond to a given shopper, with product arrangements being personalised according to a shopper's history or purchases. Planograms can be created for the display of items or goods on a virtual shelf, grouped in appropriate sections, making provision where required for alternatives and/or special offers for the particular shopper.

However, disadvantageously, such virtual store systems require shoppers to move around the virtual store when seeking other goods required. Additionally, the items displayed can comprise images that include irrelevant or misleading information, providing a cluttered view for the shopper.

Moreover, it is a common problem that a shopper using an online retailing environment accidentally orders an incorrect size or volume of an item through a lack of knowledge of weights or volumes of the item selected. For example, it is not uncommon to order accidentally an extra-large sized item when a smaller size was desired. In this regard, it is often not possible to discern from the image displayed alone, the size of the product being selected. This causes frustration for the purchaser on receiving the goods.

Furthermore, such systems and indeed systems that display virtual 3D arrangement of items on virtual shelves in virtual aisles in a virtual store waste substantial amounts of space on a display of a purchaser's computing device by filling available space white or leaving available spaces unfilled. Accordingly, particularly in the case of shopping on mobile devices, a reduced density of goods or items displayed on a shopper's screen results. This can lead to frustration for the purchaser, for example due to a need to scroll through more pages of images of items, which in turn can potentially lose customers.

According to a first aspect of the present invention, there is provided a method of improving visual recognition of an item amongst a plurality of items displayed by an electronic device having a display, the method comprising: providing a number of sets of actual dimensions of a number of the plurality of items, respectively, the number of the plurality of items comprising the item; determining a scaling factor using the number of sets of actual dimensions and a number of sets of image dimensions of a respective number of representations of the number of the plurality of items respectively contained in a number of images; applying the scaling factor to a dimension of an image to be displayed containing a representation of the item; and displaying the scaled image.

The method may further comprise: calculating a first average dimension using a same dimension of the number of sets of actual dimensions; and calculating a second average dimension using the same dimension but in respect of the number of sets of image dimensions; and calculating the scaling factor using the first average dimension and the second average dimension.

The same dimension may be height.

The number of sets of image dimensions may respectively correspond to a number of substantially minimum bounding boxes with respect to the number of representations of the number of the plurality of items contained in the number of images.

The method may further comprise: identifying a largest of the number of the plurality of items and a smallest of the number of the plurality of items; and allocating an ideal maximum dimension value and an ideal minimum dimension value to the largest identified item and the smallest identified item, respectively.

The method may further comprise: scaling the image to be displayed so as to be proportional within a range bounded by the maximum and minimum dimension values allocated to the largest and smallest identified items.

The method may further comprise: labelling the image to be displayed in response to determining that a value of the dimension of the image to be displayed corresponding dimensionally to the ideal maximum dimension value is, when scaled by the scaling factor, greater than the ideal maximum dimension value, the labelling being to indicate that the image to be displayed of the item has a relative dimension larger than shown; and/or labelling the image to be displayed in response to determining that a value of the dimension of the image to be displayed corresponding dimensionally to the ideal minimum dimension value is, when scaled by the scaling factor, smaller than the ideal minimum dimension value, the labelling being to indicate that the image to be displayed of the item has a relative dimension smaller than shown.

The method may further comprise: applying the scaling factor to each of the number of images and displaying the number of images on a virtual shelf in an online environment such that the number of images displayed are sized relative to one another.

The image to be displayed may comprise an aspect ratio associated therewith; the method may further comprise: identifying a pair of dimensions of the item that best match the set of image dimensions of the image to be displayed by: selecting a largest actual dimension of the first, second and third dimensions; calculating a first aspect ratio using the largest actual dimension and an unused dimension of the first, second and third dimensions; calculating a second aspect ratio using the largest actual dimension and a remaining unused dimension of the first, second and third dimensions; and selecting one of the first aspect ratio and the second aspect ratio that most closely matches the aspect ratio of the image.

The method may further comprise: determining whether the image to be displayed is suitable for scaling based upon the selected one of the first and second aspect ratios and the aspect ratio of the image to be displayed.

The suitability for scaling of the image to be displayed may be determined by evaluating a quotient of the aspect ratio of the image to be displayed and the selected one of the first and second aspect ratios. The aspect ratio of the image to be displayed may be the denominator of the quotient.

The method may further comprise: applying the scaling factor to the image to be displayed when the height of the item is greater than the width of the item by scaling a width dimension of the image to be displayed by the scaling factor and determining a height dimension of the image to be displayed by applying the aspect ratio of the image to be displayed to the width dimension.

The height dimension may be determined by dividing the width dimension by the aspect ratio of the image to be displayed.

The method may further comprise: applying the scaling factor to the image to be displayed when the width of the item is greater than the height of the item by scaling a height dimension of the image to be displayed by the scaling factor and determining a width dimension of the image to be displayed by applying the aspect ratio of the image to be displayed to the height dimension.

The width dimension may be determined by scaling the height dimension by the aspect ratio of the image to be displayed.

According to a second aspect of the invention, there is provided a method of digitally processing images comprising: cropping a number of images comprising representations of a number of items, respectively, so that respective sets of dimensions of the numbers of images substantially define a number of bounding boxes, respectively; performing the method of improving visual recognition of an item as set forth above in relation to the first aspect of the invention; wherein the number of cropped images are communicated to the electronic device for display.

The method may further comprise: providing an online retail environment comprising a display device arranged to display the image to be displayed.

According to a third aspect of the invention, there is provided a computer-implemented method for an electronic device having a display comprising: the device supporting an online retail environment and receiving a plurality of sets of image data pertaining to a plurality of items, respectively, each set of image data corresponding to an image having, when represented graphically, dimensions associated therewith and comprising a representation of the respective item associated with the each set of image data, and the dimensions of the image constitute a substantially minimum bounding box with respect to the representation of the respective item; the device also receiving the dimensions associated with the each set of image data and physical dimension data relating to the respective item represented by the image corresponding to the each set of image data; calculating a scaling factor using the dimensions associated with a desired image density and the physical dimension data; scaling a dimension of the image comprising the representation of the respective item using the scaling factor; and displaying the scaled image on a virtual shelf.

According to a fourth aspect of the invention, there is provided a computer program element comprising computer program code means to make a computer execute the method as set forth above in relation to the first, second and third aspects of the invention.

According to a fifth aspect of the invention, there is provided an item display system comprising: an electronic device comprising a graphical interface arranged to display a number of images selectable a user; wherein the electronic device further comprises a processing resource arranged to receive the number of images to be displayed comprising an image to be displayed, the number of images to be displayed respectively comprising a number of representations of a number of items; the processing resource is also arranged to receive a number of sets of actual dimensions of the number of items, respectively, and to determine a scaling factor using the number of sets of actual dimensions and a number of sets of image dimensions of the respective number of representations of the number of the items respectively; and the processing resource is arranged to apply the scaling factor to the image to be displayed containing a representation of an item; and the electronic device is arranged to display the scaled image.

It is thus possible to provide a system and method that displays the goods and inventory items in a manner where they are scaled relative to one another to enable a more pleasant experience for the purchaser whilst enabling an increased density of inventory items being displayed on the page in an uncluttered fashion. Furthermore, it has been shown that users find such environments easier to process mentally than virtual items in virtual environments, for example virtual shopping environments, where all the items displayed are of a common or very similar image size. Such ease of mental processing translates into a correspondingly improved online experience, for example an online shopping experience, resulting in the user being more likely to return to the virtual environment, for example store.

Additionally, the amount of unused space on a given page is significantly reduced.

The method and system further ensures that the correct scaling is applied to each virtual product image to be displayed and to place it on a virtual shelf until no more products can fit. All products are evenly distributed on the shelf, the maximum density therefore being achieved and the relative product sizes being displayed.

At least one embodiment of the invention will now be described, by way of example only, with reference to the accompanying drawings, in which.

Throughout the following description, identical reference numerals will be used to identify like parts.

Figure 1:
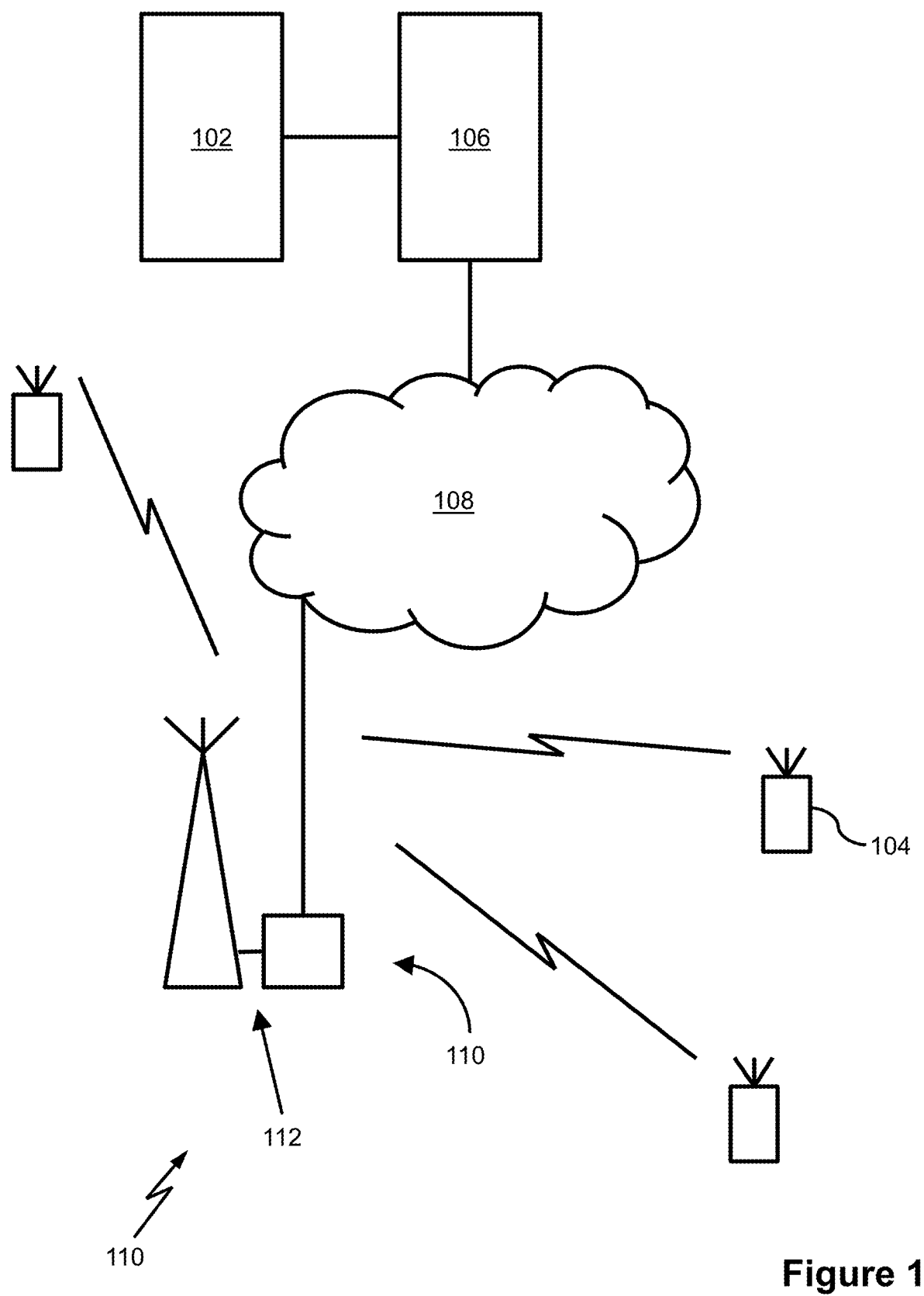
FIG. 1 is a schematic diagram of an online retail system constituting an embodiment of the invention.

Referring to FIG. 1, a communications system, for example an online retail system 100, comprises an electronic commerce server or servers 102, arranged to support the offer for sale of a plurality of items, images of which are communicated to an electronic client device 104 from which one or more of the items can be purchased.

In this regard, the electronic commerce server 102 is operably coupled to a web server 106, the web server 106 being arranged to support graphical presentation on the client device 104, for example via a web browser or an application ("app"). Although a single web server 106 is described above, the skilled person will appreciate that a greater number of web servers can be employed, for example, working in concert. The web server 106 is operably coupled to a wide area network 108, for example the Internet. In this example, the electronic client device 104 is capable of communicating with the web server 106 via a wireless communications network 110, for example a cellular communications network, such as a Long Term Evolution (LTE) network. In this example, the wireless communications network 110 is operably coupled to the wide area network 108. The wireless communications network 110 comprises a Node B 112 capable of communicating, in this example, with the electronic client device 104, the electronic client device 104 constituting, from a communications perspective, a User Equipment (UE) device. Although, in this example, the wireless communications network 110 is shown as comprising a single node B 112, the skilled person will appreciate that the wireless communications network 110 typically comprises a number of node Bs.

Also, the wireless communications network 110 comprises other functional elements within the infrastructure of the wireless communications network 110. However, for the sake of conciseness and clarity of description, such other functional elements will not be described herein.

In this example, the client electronic device 104 communicates with the web server 106 via the wireless communications network 110. However, the client electronic device 104 can communicate with the web server 104 via other communications pathways, for example via a wired Local Area Network (LAN) operably coupled to the wide area network 108 or a wireless LAN operably coupled to a LAN or the wide area network 108. In this example, the client electronic device 104 is a smartphone or some other wireless capable portable communications device. In other examples, one or more of the client electronic devices can be a computing devices, for example a Personal Computer (PC) supporting a web browser application.

Figure 2:
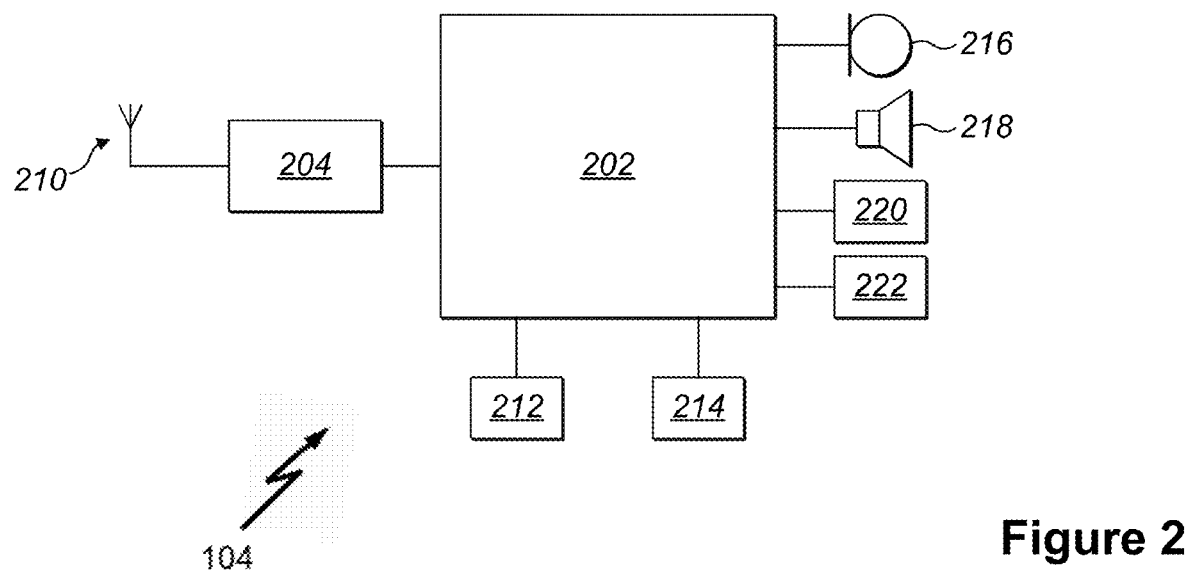
FIG. 2 is a schematic diagram of a client-side electronic device of the system of FIG. 1.

Turning to FIG. 2, as mentioned above, the client electronic device 104, device operates in the LTE communications system 110 and comprises a processing resource 202, the processing resource 202 being, in this example, a chipset of a cellular communications device. The processing resource 202 is coupled to a transceiver module 204, the transceiver module 204 being coupled to an antenna module 210.

The client electronic device 104 also possesses a volatile memory, for example a Random Access Memory (RAM) 212, and a non-volatile memory, for example a digital memory 214, each coupled to the processing resource 202. The processing resource 202 is also coupled to a microphone 216, a speaker unit 218, a keypad 220 and a display 222. In this example, display 222 is a touch screen display constituting both an input and an output device and the keypad 220 functionality is supported by the touch screen display 222, which is an example of a virtual keypad. The skilled person should appreciate that the architecture of the client electronic device 104 described above comprises other elements, but such additional elements have not been described in detail herein for the sake of preserving conciseness and clarity of description.

Figure 3:
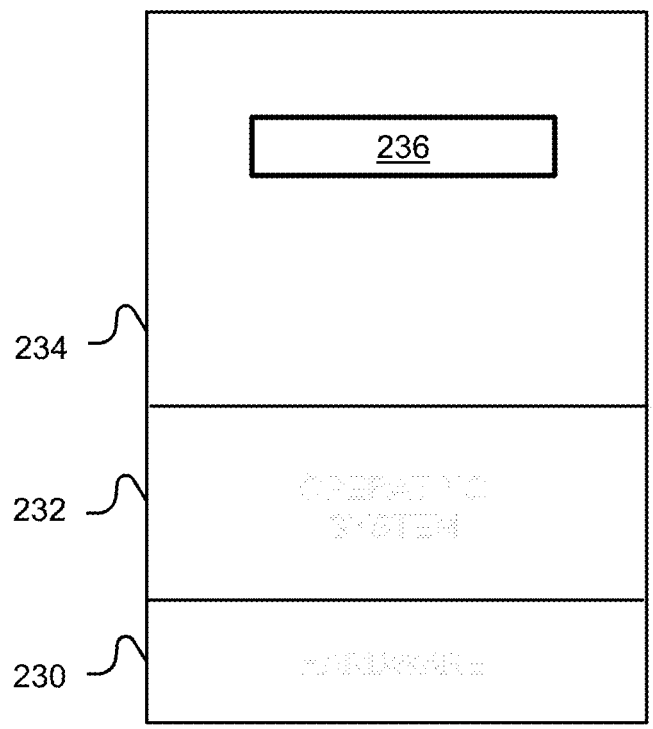
FIG. 3 is a schematic representation of an architectural stack employed by a processing resource of the client-side electronic device of FIG. 2.

Referring to FIG. 3, in this example, an operating system 232 is executed by functional hardware components 230, which provides an environment in which application software 234 can run. The hardware 230 of the client electronic device 104, depending upon the specific configuration of the client electronic device 104, executes any suitable operating system, for example a version of Windows Mobile™, iOS®, or a build of Android®. The operating system supports the execution of applications to implement operation of the client electronic device 104. The operating system 232 serves to control the functional hardware components 230 and resides between the application software 234 and the functional hardware components 230. In this example, one of the applications is an online retail application 236.

Figure 4:
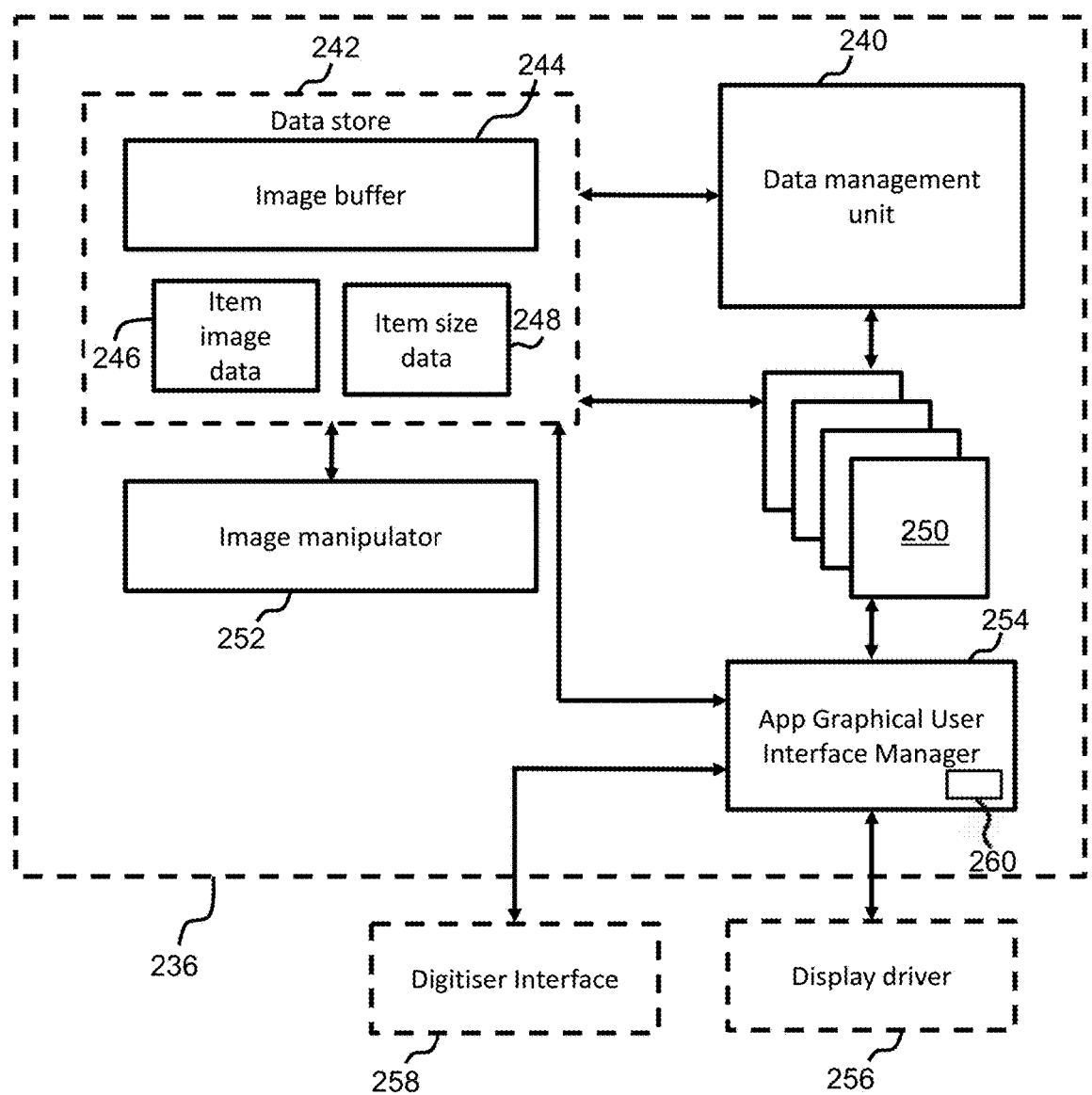
FIG. 4 is a schematic diagram of an online retail application constituting a further embodiment of the invention.

Turning to FIG. 4, the online retail application 236 comprises a data management unit 240 operably coupled to a data store 242 supported by, for example, the RAM 212 of the client electronic device 104. The data store 242 is arranged to store, inter alia, images 244 of items, item image dimension data 246 relating to the images stored, and item actual dimension data 248. The data store 242 and the data management unit 240 are operably coupled to a plurality of functional modules 250 that support online retail functionality using the client electronic device 104, for example search functionality, shopping cart functionality, and list functionality. Many aspects of the functionality provided by the plurality of functional modules 250 associated with e-commerce functionality are not relevant to the examples set further herein and so will not be described further. The skilled person will appreciate, though, that one or more of the plurality of functional modules 250 cooperate to provide the online retain functionality. The online retail application 236 also comprises an image manipulator module 252 coupled to the data store 242. The data store 242 and the plurality of functional modules 250 are operably coupled to a GUI management unit 254, which is arranged to receive graphical-related data for arrangement in accordance with an interface scheme and structure of the online retail application 236 and output via the touch screen display 222. The GUI management unit 254 is operably coupled to a display driver 256 and a digitiser interface 256 associated with the touch screen display 222 of the client electronic device 104. In this example, the GUI management unit 254 comprises a virtual shelf view module 260.

Figure 5:
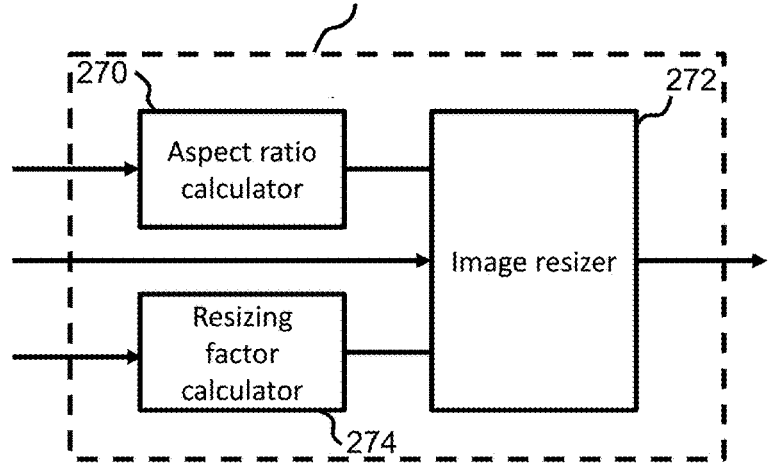
FIG. 5 is a schematic diagram of an image manipulator module of FIG. 4.

Referring to FIG. 5, the image manipulator module 252 comprises an aspect ratio calculator 270 having an input for receiving data and an output operably coupled to an image resizer module 272, an output of the image resizer module 272 being operably coupled to the data store 242. The image manipulator module 252 also comprises a re-sizing factor calculator 274 having an input for receiving data and an output operably coupled to the image resizer module 272.

It should be appreciated that the electronic commerce server 102 stores a considerable amount of data of different types. Of particular relevance to the examples set forth herein, the electronic commerce server 102 comprises images of items being offered for sale through the electronic commerce server 102. In this regard, the electronic commerce server 102 comprises a plurality of images respectively comprises a plurality of representations of a plurality of items being offered for sale. The electronic commerce server 102 also comprises a plurality of sets of image dimension data relating to the dimensions of the images stored, for example width×height dimensions. The image dimension data can be stored separately or can accompany the image data as metadata. Additionally, the electronic commerce server 102 stores actual dimension data concerning the actual dimensions of the items and any suitable data associating the actual dimension data to the image data stored. Further information, for example weight, size, organic status, vegetarian status, availability, price, nutritional data, or promotions data, is also stored by the electronic commerce server 102 as well as a number of other types of data. However, for the sake of clarity and conciseness of description, only the types of data relevant to a description of the implementations exemplifying the inventive concepts set forth herein will be described.

In relation to the images stored, these are, in this example, two dimensional product images supplied either as images from the actual product or inventory item. In some examples, images can be obtained from commercial entities supplying digital images.

Figure 6:
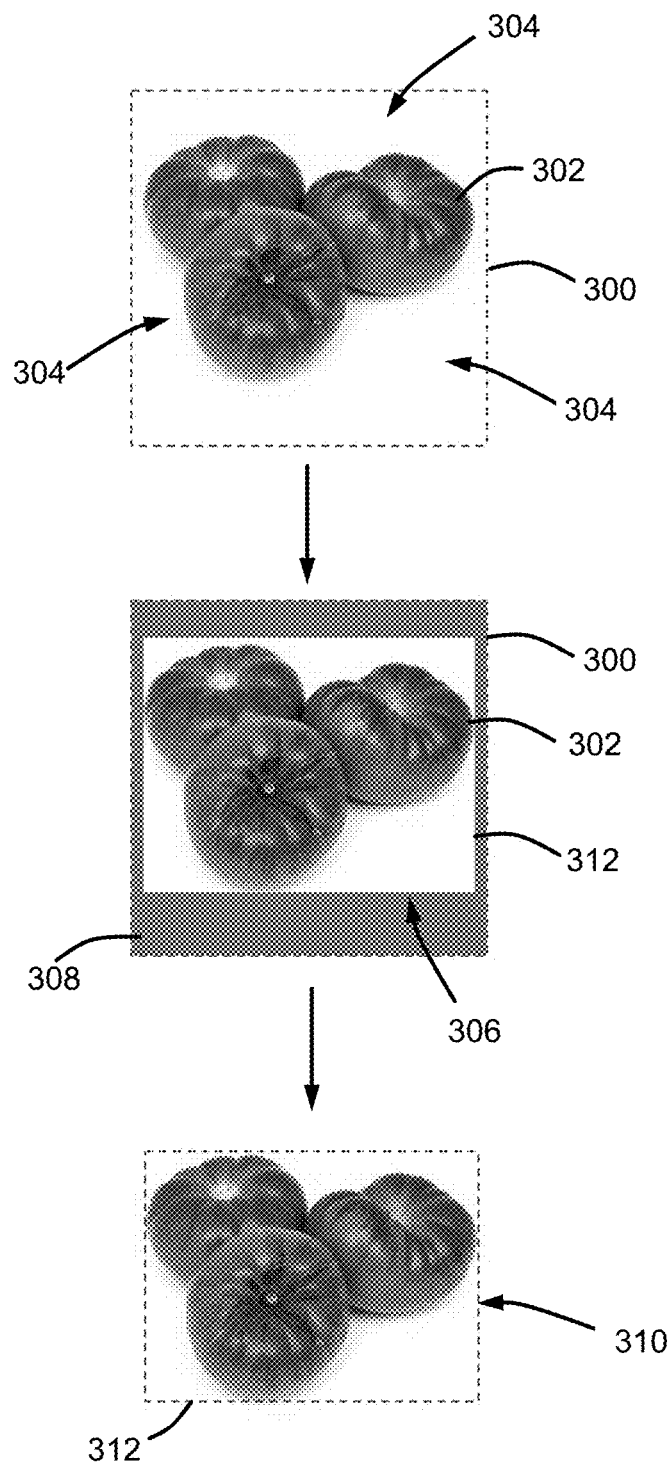
FIG. 6 is a schematic diagram of an image being pre-processed.

Prior to operation of the examples of the electronic commerce server 102 described herein, the images stored by the electronic commerce server 102 need to be pre-processed in order to minimise the amount of background space that surrounds the representation of the item in a given image. Referring, for example, to FIG. 6, a given image 300 of an item, for example tomatoes, comprises a representation 302 of the item and a background 304. The background 304 is typically visible around the representation 302 of the item. In this example, the background is white in colour. In order to ensure the given image 300 is suitable for use in the examples set forth herein, as much of the background as possible needs to be removed from the given image 300, within the constraint of the image being of rectangular dimensions, for example width×height. In this example, the given image 300 is cropped using a cropping tool of an image processing application (not shown), a rectangular cropping box 306 being formed around the representation 302 of the item. Upon completion of the cropping function, extraneous background space 308 peripheral to the representation 302 of the item is removed from the given image 300. A cropped image 310 therefore results having image dimensions corresponding to a substantially minimum bounding boxes 312 with respect to the representation 302 of the item. This action is performed in relation to the images stored by the electronic commerce server 102 to ensure the plurality of images stored are compatible with the technique improving visual recognition of an item set further herein.

In operation, the client electronic device 104, via the online retail application 236 makes a request to the electronic commerce server 102 and the web server 106 to receive details of items. In one example, the user can enter a search query through the online retail application 236 or simply browse items after selection of a category of items. In any event, the electronic commerce server 102 and the web server 106 cooperate to retrieve, in response to the request from the online retail application 236, a number of the plurality of images containing respective representations of a number of items to be reviewed by the user, and the web server 106 communicates the number of images to the online retail application 236. In this example, the number of images respectively comprise meta data that includes a respective number of sets of dimensions of the number of images. As mentioned above, the number of sets of dimensions of the number of images, as pre-prepared above, constitute respective substantially minimum bounding boxes, and so the number of sets of dimensions is effectively a number of respective dimensions of the number of representations of the number of items.

Additionally, the electronic commerce server 102 and the web server 106 cooperate to retrieve a number of sets of actual dimensions respectively related to the number of items, and the web server 106 communicates the number of actual dimensions to the online retail application 236. In this example, the image data, including the sets of dimension data and the sets of actual dimension data are communicated to the online retail application 236 in accordance with a data structure definition, for example a predetermined data structure.

The number of image files and the sets of actual dimension data are communicated to the online retail application 236 in accordance with the data structure definition, which is received by the online retail application 236 and the data management unit 240 extracts the number of sets of image data concerning the graphical representation of the number of items, the associated respective sets of image dimension data and the respective sets of actual dimension data. The extracted data is then stored by the data management unit 240 in the data store 242 as the images 244 the number of items, item image dimension data 246 relating to the number of images stored, and item actual dimension data 248. Other data relating to the items, for example the price, SKU, weight and/or nutritional value, or any other salient information is also extracted by the data management unit 240 (if received) and stored in the data store 242.

One or more of the plurality of functional modules 250 access the data store 242 and cooperate with the GUI management unit 254, in order to support provision of an online retail environment in accordance with the structure of the online retail application 236. As the functionality of the plurality of functional modules 250 that do not handle manipulation of the graphical representations of items is not central to the examples set forth herein, in order to preserve clarity and conciseness of description, the operation of much of the plurality of functional entities 250 will not be described further.

Figure 7:
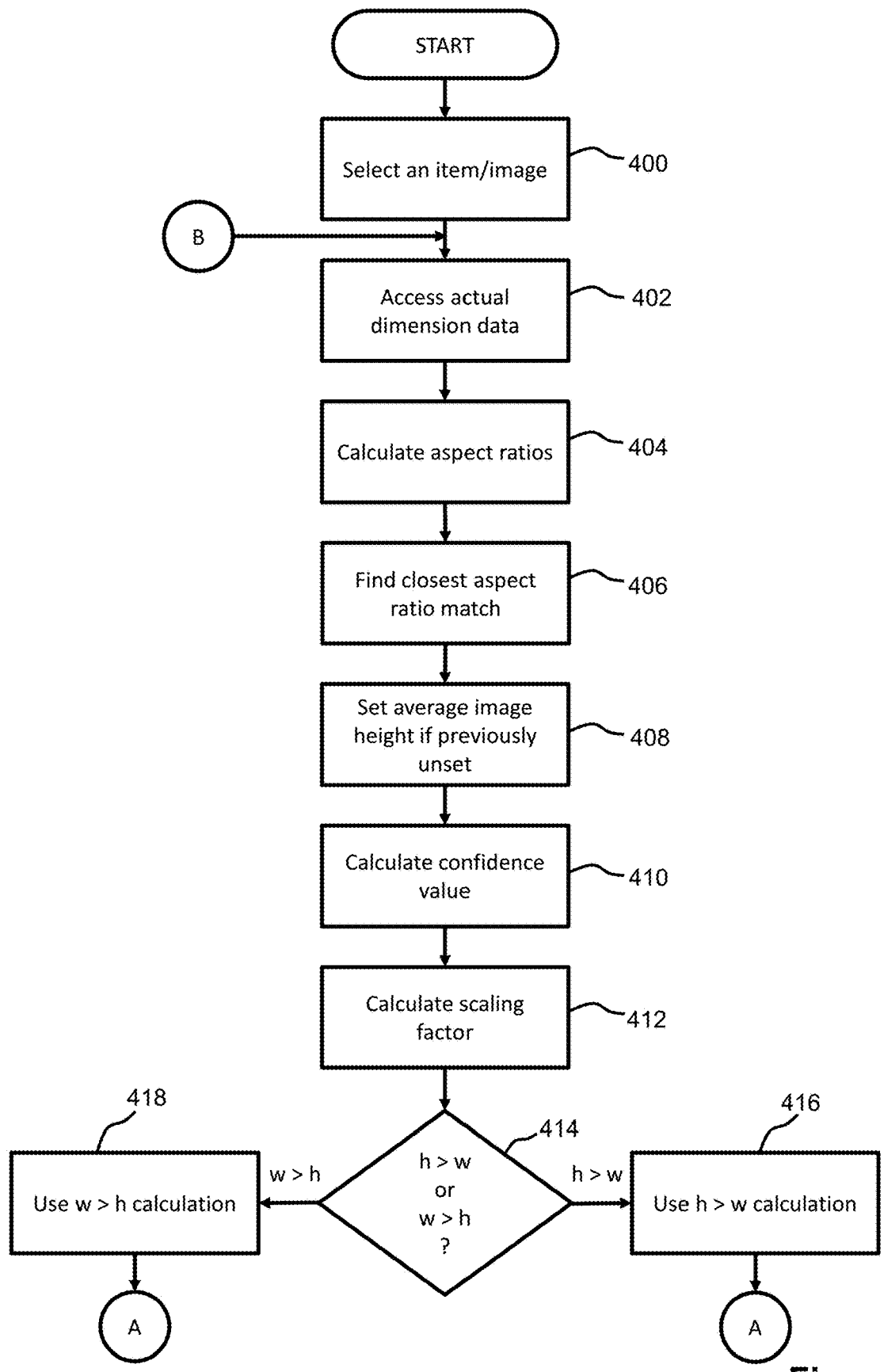
FIGS. 7 and 8 are a flow diagram of a method of improving visual recognition of an item constituting a yet further embodiment of the invention.
Figure 8:
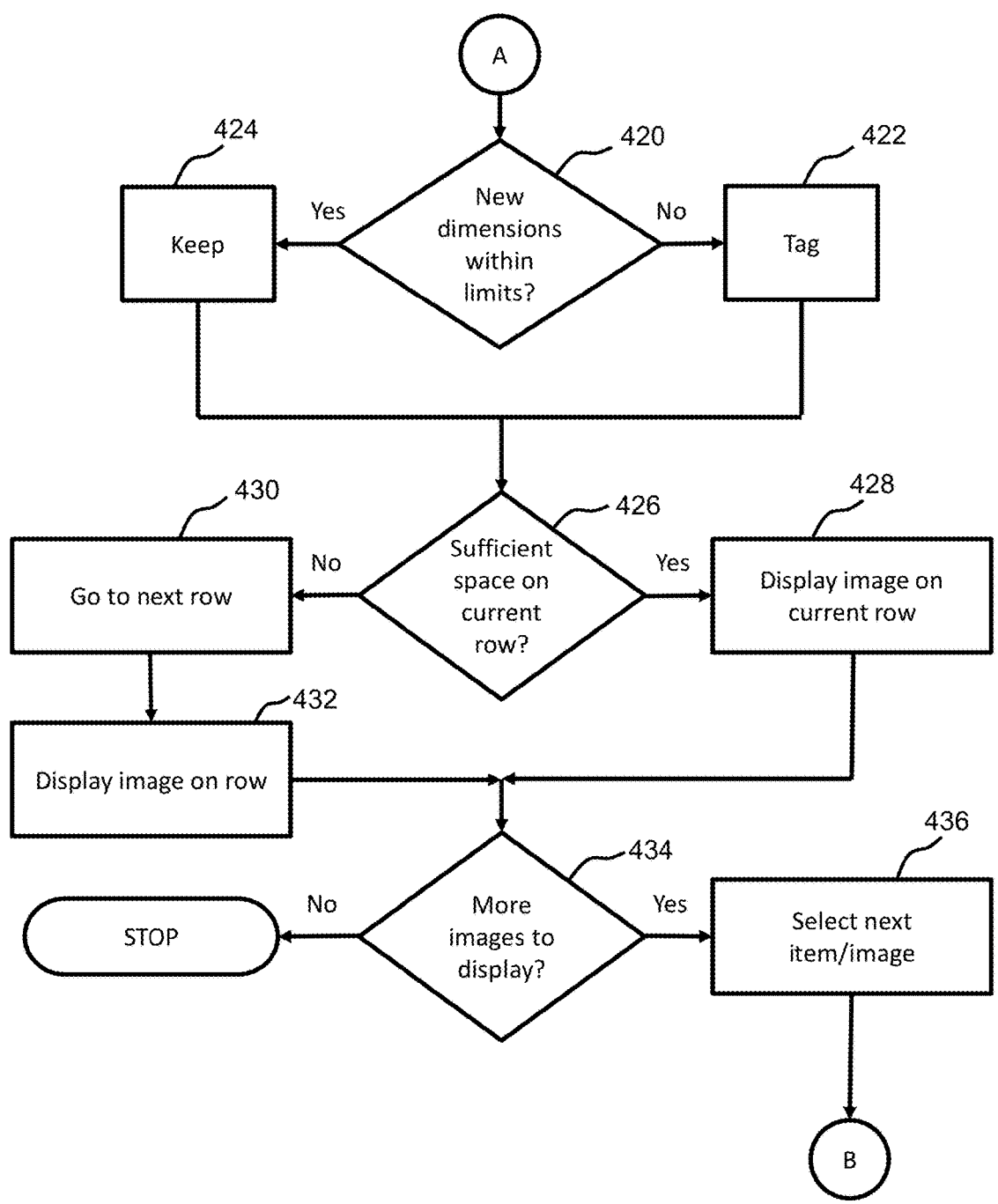

Referring to FIGS. 7 and 8, the image manipulator module 252 is responsible for attempting to manipulate one or more of the number of images in order to improve visual recognition of one or more respective items when displayed via the touch screen display 222 of the client electronic device 104. In this respect, the image manipulator module 252 retrieves a first image (Step 400) of the number of images from the data store 242 along with the associated first set of image dimension data (Step 402) and the first set of actual dimension data in respect of the first item.

Product actual dimensions are supplied in the form A×B×C and are measured directly as actual dimensions from the product or inventory item itself. In most cases, A×B×C does not map directly to the format width (w)× height (h)×depth (d) and a decision needs to be made as to which two dimensions comprise the dimensions that will result in accurate display the FOP of the item. For example, using the A×B×C format mentioned above, a pizza box can have relatively large A×B dimensions and a relative small C dimension. In this regard, the dimensions selected should be appropriate to scale the A×B dimensions and not include C, which corresponds to the end of the pizza box and so will result in incorrect scaling if used.

The actual product size information is therefore used to identify which dimensions out of A×B×C correspond to the actual width and actual height of the product. The dimensions actually constituting the width and height of the inventory item can be obtained by comparison of aspect ratios calculated from pairs of actual dimensions and the aspect ratio of the two dimensional image of the product.

In this regard, the image manipulator module 252 initially analyses the actual physical dimensions of the first item in order to determine a best pair of physical dimensions, for example height×width, width×depth or height×depth, which matches the dimensions of the first image. The aspect ratio calculator 260 therefore calculates an aspect ratio of the first image (Step 404), using the larger of the two dimensions of the first image as a denominator, the dimensions being in pixels. The aspect ratio calculator 260 then selects the largest of the physical dimensions and calculates aspect ratios (Step 404) using each of the remaining two actual dimensions of the first set of actual dimensions, using the selected largest dimension as the denominator so as to yield a first actual aspect ratio and a second actual aspect ratio. For example, if the height dimension is the largest of the three dimensions of the first set of actual dimensions, the first actual aspect ratio is calculated using the height and the width dimensions and the second actual aspect ratio is calculated using the height and the depth dimensions. The aspect ratio calculator 260 then compares (Step 406) the first and second actual aspect ratios calculated with the aspect ratio of the first image in order to identify which of the first and second actual aspect ratios is closest to the image aspect ratio. From whichever of the first and second actual aspect ratios found to match most closely the image aspect ratio, the associated dimensions are identified, for example height and width or height and depth, assuming that the height is the largest actual dimension of the first item.

If not yet determined, an average image height is set (Step 408) based upon a desired maximum and a desired minimum image height selected on the basis, for example, of a required density of images that need to be displayed by the display 222, for example 75 px and 225 px, resulting in an average image height of 150 px. Based on the height data obtained in relation to all products to be displayed in a given in virtual aisle or search term, the largest and smallest products are identified (min/max) and an ideal minimum height value and an ideal maximum height value are set, for example 56 dp and 170 dp, respectively, although alternative values may be used. In particular, the maximum and minimum ideal heights can differ depending upon the operating system and/or device display characteristics.

Thereafter, the image manipulator module 252 calculates (Step 410) a level of confidence between the physical aspect ratio selected and the image aspect ratio. In this regard, the aspect ratio calculator 270 calculates a ratio between the actual aspect ratio calculated in respect of the best pair of dimensions selected and the image aspect ratio of the first image. For example, if the selected actual aspect ratio is 0.34 and the image aspect ratio is 0.38, then the confidence ratio is 0.34/0.38=0.89. If converted to a percentage, this translates to 89%. In the event that the confidence ratio is higher than 75%, then the aspect ratio calculator 270 communicates to the image resizer module 272 that the first image can be re-sized.

However, in the event that it has been determined that the first image can be scaled, a resizing factor or scaling factor is calculated (Step 412) by the resizing factor calculator 274. The resizing factor calculator 274 calculates the resizing factor, in this example, by analysing actual dimension data and image dimension data associated with a first n images of the number of images stored in the data store 242, for example the first 30 images. In this regard, the resizing factor calculator 274 analyses the height dimension of the actual dimension data and the image dimension data and calculates a mean value for each. For example, for the first 30 actual heights of the first 30 items, the resizing factor calculator 274 calculates the mean as: $(h_{a1}+h_{a2}+h_{a3}+ \ldots +h_{a29}+h_{a30})/30$.

The resizing factor is then calculated by evaluating the quotient of the average image height calculated above (Step 408) and the average height of the first n items in millimetres, i.e. scaling factor=mean image height/mean actual height. The calculated scaling factor is also used in relation to the remaining images to be displayed. The scaling factor and the image aspect ratio are communicated to the image resizer module 272, which then resizes according, in this example, to the following rules.

In respect of a given image to be scaled, if the actual height dimension of the item is greater than the width dimension (Step 414), then the given image is scaled (Step 416) by scaling the width dimension of the image by the scaling factor calculated, and the height dimension of the given image is set by divided the scaled width dimension calculated by the image aspect ratio. However, in the event that the actual width dimension of the item is greater than the height dimension of the item (Step 414), then the given image is scaled (Step 418) by scaling the height dimension of the given image by the scaling factor calculated and the width dimension of the image is set to the product of the scaled height calculated and the image aspect ratio.

In the event that the newly calculated dimensions for the given image are less than the minimum size threshold or greater than the maximum size threshold determined above (Step 420), then the given image is not resized and the image is tagged (Step 422), for example with the letters "xs" or "XL" to designate that the item is particularly small or large, depending upon which size criterion has not been met.

In the event that it is determined that the scaled image is within minimum and maximum size thresholds, the given image, for example the first scaled image, is kept (Step 424). Once resized, or if resizing is not suitable, unchanged, the given image is communicated to the GUI management unit 254 for arrangement on a virtual shelf by one of the plurality of functional modules 250 requiring the first image to be displayed, for example a search module (not shown). In this regard, the virtual shelf view module 260 determines (Step 426) whether a current virtual shelf has sufficient space to accommodate the image received from the image manipulator module 252. If sufficient space exists for the image received, the received image is located on the current virtual shelf (Step 428), whereas if insufficient space remains on the shelf, the data output unit 254 generates another virtual shelf below the full virtual shelf (Step 430) and the image is located on the new virtual shelf (Step 432), i.e. the placement of the images on the virtual shelves is subject to wrapping. Once the image is placed on the virtual shelf, the data output module 254 determines (Step 434) whether more images are to be received for placement on the virtual shelf or shelves. If no further images are to be received, the GUI management unit 254 passes the data corresponding to the images placed on the virtual shelves to the display driver 256 for output via the display 222. Otherwise, the next image of the number of images is selected (Step 436) and the above process is repeated in respect of the selected image.

Figure 9:
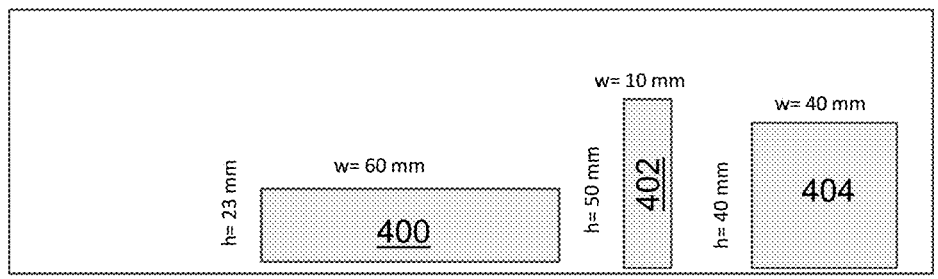
FIGS. 9 to 11 are schematic diagrams of images being resized in accordance with an embodiment of the invention.
Figure 10:
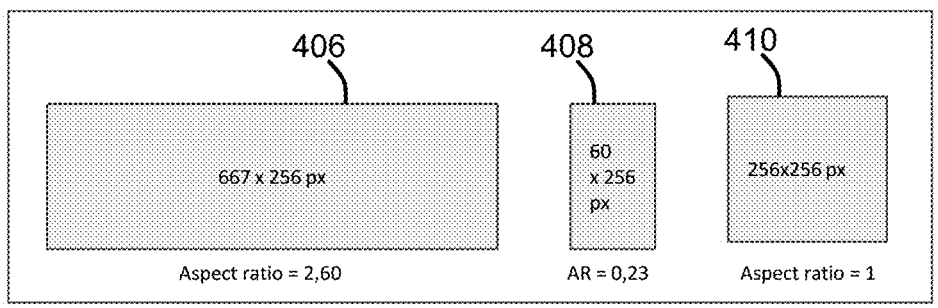
Figure 11:
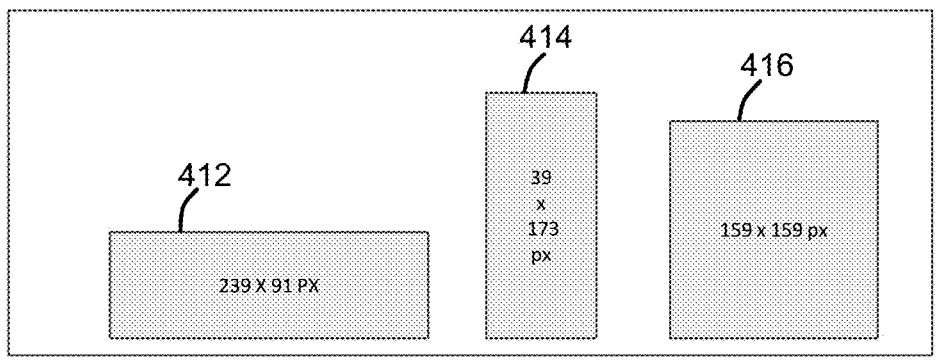

By way of further example detailed and with reference to FIGS. 9 to 11, the first item 400 has a height dimension of 23 mm and a width dimension of 60 mm. A second item 402 has a height dimension of 50 mm and a width dimension of 10 mm. A third item 404 has a height dimension of 40 mm and a width dimension of 40 mm. The first image 406 comprising a representation of the first item 400 has an image height dimension of 256 px and an image width dimension of 557 px. A second image 408 comprising a representation of the second item 402 has an image height dimension of 256 px and an image width dimension of 60 px. A third image 410 comprising a representation of the third item 404 has an image height dimension of 256 px and an image width dimension of 256 px.

Assuming for the first second and third items 400, 402, 404, the average physical height is: 37.6 mm ((23+50+40)/3), the average image height, which is predefined, is 150 dp, then the resizing factor is 3.98 px/mm (150 px/37.6). Using these calculated values, the first image resizing calculation is as follows to yield the first resized image 412.

New height=23 mm×3.98 px/mm=91.96 px

New width=91.96*2.6=239.09 px

New image size=239×91

The second image resizing calculation is as follows to yield a second resized image 414.

New width=10 mm×3.98 px/mm=39.8 px

New height=38.29*0.23=173.04 px

New image size=39×173

The third image resizing calculation is as follows to yield a third resized image 416.

New height=40 mm×3.98 px/mm=159.2 px

New width=159.2*1=159.2 px

New image size=159×159

In relation to the third image, when the width dimension and the height dimension are the same, the image is treated as if the width dimension is greater than the height dimension.

In another example, once products are placed on an individual virtual shelf by the virtual shelf view module 260, the height of the shelf itself can be calculated for displayed accordingly. In this way, the relative heights between shelves can be varied.

Figure 12:
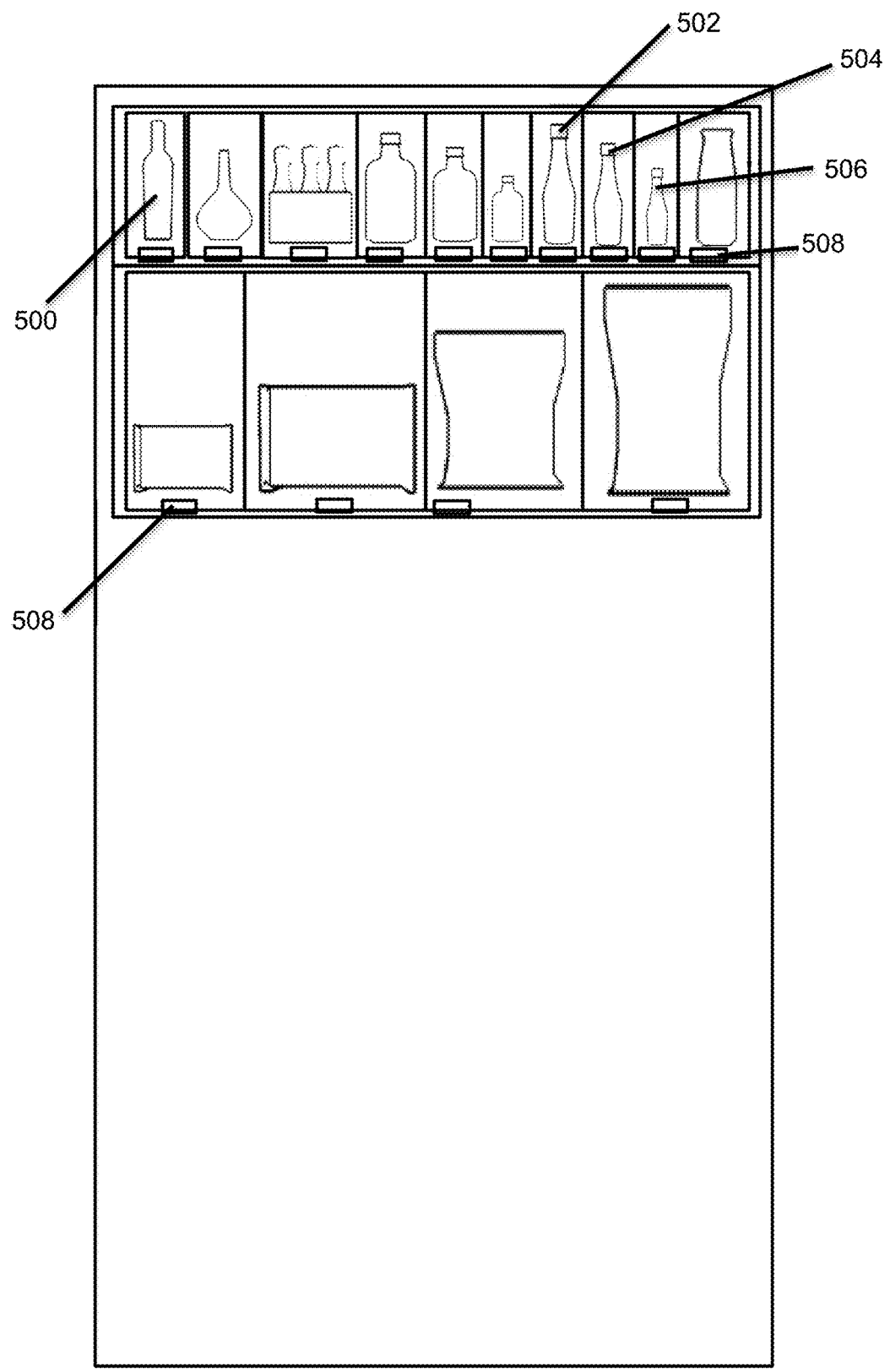
FIG. 12 is a schematic diagram of a display of the client-side electronic device of FIG. 2 providing an online retail environment constituting yet another embodiment of the invention.
Figure 13:
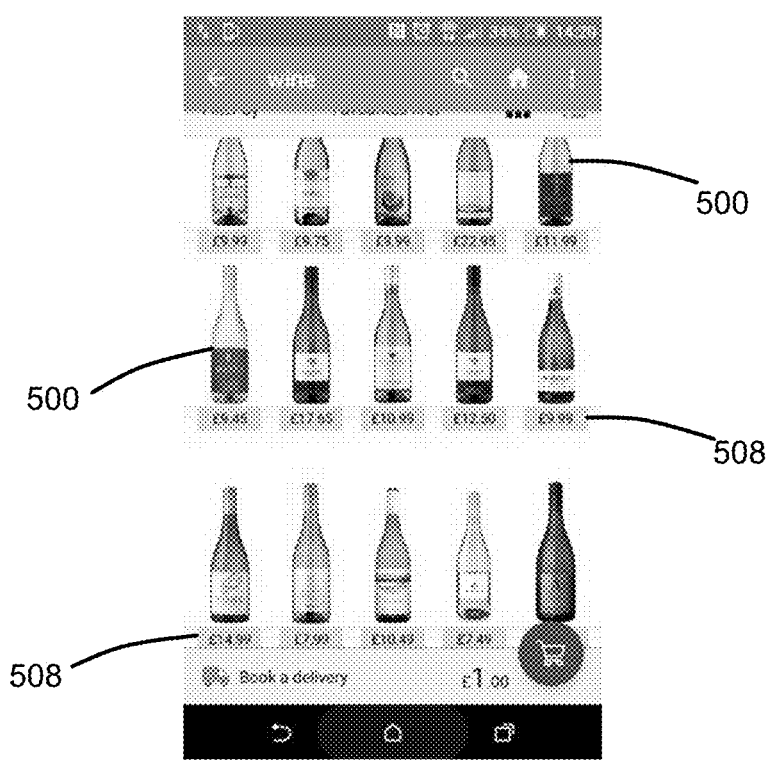
FIG. 13 is a screen shot of the display of the client-side electronic device of FIG. 2.

Referring to FIGS. 12 and 13, when arranged by the virtual shelf view module 260 and displayed via the display driver 256 following resizing of the images, the images 500 of the items displayed alongside each other are sized relative to the sizes of the inventory items to which the images correspond.

In this example, the images of a plurality of bottles can be scaled relative to one another using the above-described technique to display more accurately the sizes of the bottles next to each other on a shelf. In this way, images 500 items of similar goods are displayed relative to each other such that a purchaser can make a purchasing decision by selecting one of a number of different brands or types of a given inventory item. If a user is looking at a virtual shelf displaying all types of milk, the cartons and bottles are displayed with sizes relative to one another.

In another example, images 500 of inventory items are displayed scaled relative to each other when a user searches for the item via a search algorithm used within the online shopping environment. For example, if a user searches for a specific brand of milk and the search algorithm returns three different results, a relatively small, intermediate and large item of the same brand of milk, the relative scaling of the item makes it clear immediately to the purchaser which is the largest item 502, which is the intermediately sized item 504 and which is the smallest item 506 in terms of weight or volume, for example. No additional information need be displayed with the image to distinguish the items from each other. Furthermore, this relative sizing on a given shelf view enables the items to be displayed with a minimum of white or unused space between them. It will be appreciated that further information can be provided in response to a user selecting a given image and being directed to a further page on which more information provided. It will be appreciated that only the image and the price 508 need be displayed as the relative sizings of the images implicitly impart more information.

In another example, additional information can be provided, for example, by hovering a mouse pointer over an image of an item and additional information is then displayed in response to the hovering. Indeed, many other methods are known to those skilled in the art that can be used to include additional information in relation to each item without the need to use portions of space on, above or around the virtual shelf.

It will be appreciated that in this way the density of products displayed per page can be increased and the amount of unused white space decreased.

While specific examples of the invention have been described above, the skilled person will appreciate that many equivalent modifications and variations are possible.

Accordingly, the exemplary embodiments of the invention set forth above are considered to be illustrative and not limiting. Various changes to the described embodiments may be made without departing from the spirit and scope of the invention.

For example, in the event that absolute scaling of products is not possible, for example, if the user is looking at their virtual shopping basket displayed in a shelf view format after having selected a small item, such as a packet of stamps, and a large item, such as a bulk purchase of pet food biscuits, displaying these two items in the virtual shopping basket on a virtual shelf relative to each other can result in one of the images being un-viewable. In this case, it is possible to scale the relative product images such that their size is displayed relative to one another but not to absolute values.

In order to achieve the relative scaling of product images, either in shelf or aisle or store view or in basket view or in search view, it is necessary to calculate the relative product sizes from actual products, apply a product scaling function and size the image accordingly.

Furthermore, it will be appreciated that a number of different methods of relatively scaling images of inventory items can be used at any one time for different virtual shelves in a single page view or different virtual aisles in a given shop. In this respect, a first method of relatively scaling images comprises proportional scaling. A second method of relatively scaling images comprises linear scaling. The method used can depend on the relative size of the smallest and largest item to be displayed.

Additionally, as mentioned above, virtual shelves being displayed within a virtual aisle can be dynamic in height, the height of the shelf being determined by the height of the largest product to be displayed on the shelf.

For example, the minimum height of a product can be set at 50 dp, such that users or customers are able to shop from a given view even if the products or items to be displayed are relatively smaller when compared to other virtual products to be displayed in the virtual aisle or virtual shelf.

It should be appreciated that if it is not possible to display scaled images of virtual items, standard or non-scaled images may be used. This can be the case if a user is viewing information offline.

In the case of loose inventory items, for example fruit and vegetables, these can be harder to scale in the manner described herein, but a virtual cuboid dimensioning structure can be imposed on to the item in question and the virtual cuboid imposed scaled according to any appropriate technique described above.

In another example, the ratio between real minimum and real maximum (product heights), resulting from a search term/browse category/browse sub-category, and the ratio between ideal minimum and maximum heights can be used to decide whether proportional or linear scaling should be used, for example if the ratio between the real minimum height and real maximum height is greater than the ratio between the ideal minimum and maximum heights, proportional scaling is used to resize product images in the virtual aisle or shelf or search term. With this scaling, the proportional sizing of all the items is maintained and the smallest product takes the optimal height between, for example about 50 dp and about 180 dp.

Alternatively, if the ratio between the real minimum and real maximum product heights is smaller than the ideal minimum and maximum then linear scaling is employed. When using the linear scaling method, the minimum height is scaled up to, for example about 50 dp and the maximum height is scaled down to, for example about 180 dp.

In other examples, additional features that can be employed to improve the visual impact and ease of use of a product search and selection pages or screens. For example, shadowing can be applied to the representation of items in the images, items, for example a hand or a ruler, can be added to the image in order to give a greater appreciation of scale.

Although the above examples have been described in the context of an online retail system, the skilled person should appreciate that the above system and method can be applied to other environments where improved visual recognition of items represented graphically is required.

The methods of the above embodiments may be provided as computer programs or as computer program products or computer readable media carrying a computer program which is arranged, when run on a computer or other processor, to perform the method(s) described above.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

The invention claimed is:

1. A method of improving visual recognition of an item amongst a plurality of items displayed by an electronic device having a display, the method comprising:
   providing a number of sets of actual dimensions of a number of the plurality of items, respectively, the number of the plurality of items including the item;
   identifying a largest item of the number of the plurality of items and a smallest item of the number of the plurality of items;
   allocating an ideal maximum dimension value and an ideal minimum dimension value to the largest identified item and the smallest identified item, respectively;
   determining a scaling factor using the number of sets of actual dimensions and a number of sets of image dimensions of a respective number of representations of the number of the plurality of items respectively contained in a number of images, wherein based on the scaling factor the image to be displayed is scaled so as to be proportional within a range bounded by the maximum and minimum dimension values allocated to the largest and smallest identified items;
   applying the scaling factor to a dimension of an image to be displayed containing a representation of the item, thereby changing a size of the image to be displayed; and
   displaying the image to be displayed.

2. A method as claimed in claim 1, comprising:
calculating a first average dimension using a same dimension of the number of sets of actual dimensions;
calculating a second average dimension using the same dimension but with respect to the number of sets of image dimensions; and
calculating the scaling factor using the first average dimension and the second average dimension.

3. A method as claimed in claim 1, wherein the number of sets of image dimensions respectively correspond to a number of substantially minimum bounding boxes with respect to the number of representations of the number of the plurality of items contained in the number of images.

4. A method as claimed in claim 1, comprising:
labelling the image to be displayed in response to determining that a value of the dimension of the image to be displayed corresponding dimensionally to the ideal maximum dimension value is, when scaled by the scaling factor, greater than the ideal maximum dimension value, the labelling being to indicate that the image to be displayed of the item has a relative dimension larger than shown; and/or
labelling the image to be displayed in response to determining that a value of the dimension of the image to be displayed corresponding dimensionally to the ideal minimum dimension value is, when scaled by the scaling factor, smaller than the ideal minimum dimension value, the labelling being to indicate that the image to be displayed of the item has a relative dimension smaller than shown.

5. A method as claimed in claim 1 comprising:
applying the scaling factor to each of the number of images and displaying the number of images on a virtual shelf in an online environment such that the number of images displayed are sized relative to one another.

6. A method as claimed in claim 1, wherein the image to be displayed has an aspect ratio associated therewith, the method comprising:
identifying a pair of dimensions of the item that best match the set of image dimensions of the image to be displayed by:
selecting a largest actual dimension of first, second and third dimensions;
calculating a first aspect ratio using the largest actual dimension and an unused dimension of the first, second and third dimensions;
calculating a second aspect ratio using the largest actual dimension and a remaining unused dimension of the first, second and third dimensions; and
selecting one of the first aspect ratio and the second aspect ratio that most closely matches the aspect ratio of the image.

7. A method as claimed in claim 6, comprising:
determining whether the image to be displayed is suitable for scaling based upon the selected one of the first and second aspect ratios and the aspect ratio of the image to be displayed.

8. A method as claimed in claim 1 comprising:
applying the scaling factor to the image to be displayed when a height of the item is greater than a width of the item by scaling a width dimension of the image to be displayed by the scaling factor and determining a height dimension of the image to be displayed by applying an aspect ratio of the image to be displayed to the width dimension.

9. A method as claimed in claim 1 comprising:
applying the scaling factor to the image to be displayed when a width of the item is greater than a height of the item by scaling a height dimension of the image to be displayed by the scaling factor and determining a width dimension of the image to be displayed by applying an aspect ratio of the image to be displayed to the height dimension.

10. A method of digitally processing images, the method comprising:
cropping a number of images having representations of a number of items, respectively, so that respective sets of dimensions of the numbers of images substantially define a number of bounding boxes, respectively; and
performing the method of improving visual recognition of an item as claimed in claim 1; wherein
the number of cropped images are communicated to the electronic device for display.

11. A method as claimed in claim 10, comprising:
providing an online retail environment having a display device arranged to display the image to be displayed.

12. A computer program element on a non-transitory storage medium comprising:
computer program code means for causing a computer execute the method as claimed in claim 1.

13. A computer-implemented method for an electronic device supporting an online retail environment and having a display, the method being stored on a non-transitory computer readable medium for causing the electronic device to perform steps comprising:
receiving a plurality of sets of image data pertaining to a plurality of items, respectively, each set of image data corresponding to an image having, when represented graphically, dimensions associated therewith and having a representation of the respective item associated with the each set of image data, wherein the dimensions of the image constitute a substantially minimum bounding box with respect to the representation of the respective item;
receiving the dimensions associated with the each set of image data and physical dimension data relating to the respective item represented by the image corresponding to the each set of image data;
identifying a largest item of the plurality of items and a smallest item of the plurality of items;
allocating an ideal maximum dimension value and an ideal minimum dimension value to the largest identified item and the smallest identified item, respectively;
calculating a scaling factor using the dimensions associated with a desired image density and the physical dimension data, wherein the scaling factor scales the image to be displayed so as to be proportional within a range bounded by the maximum and minimum dimension values allocated to the largest and smallest identified items;
scaling a dimension of the image having the representation of the respective item using the scaling factor, thereby changing a size of the image; and
displaying the scaled image on a virtual shelf.

14. An item display system comprising:
an electronic device having a graphical interface arranged to display a number of images selectable a user; wherein
the electronic device includes a processing resource arranged to receive the number of images to be displayed, the number of images including an image to be displayed, the number of images to be displayed respectively including a number of representations of a number of items;

the processing resource being configured to:
- receive a number of sets of actual dimensions of the number of items, respectively,
- identify a largest item of the number of representations of the number of items and a smallest item of the number of representations of the number of items,
- allocate an ideal maximum dimension value and an ideal minimum dimension value to the largest identified item and the smallest identified item, respectively, and
- determine a scaling factor using the number of sets of actual dimensions and a number of sets of image dimensions of the respective number of representations of the number of the items respectively, wherein the scaling factor scales the image to be displayed so as to be proportional within a range bounded by the maximum and minimum dimension values allocated to the largest and smallest identified items; and the processing resource being configured to apply the scaling factor to the image to be displayed containing a representation of an item, thereby changing a size of the image to be displayed; and the electronic device being configured to display the image to be displayed.

* * * * *